(12) United States Patent
Fremont

(10) Patent No.: US 11,306,854 B2
(45) Date of Patent: Apr. 19, 2022

(54) METHOD AND APPARATUS FOR INSTALLING AN ASSURANCE CAP ONTO A FLUID CONNECTOR USING OPTICAL AND INDUCTION SENSORS

(71) Applicant: Oetiker NY, Inc., Lancaster, NY (US)

(72) Inventor: Bradley C. Fremont, Tonawanda, NY (US)

(73) Assignee: Oetiker NY, Inc., Lancaster, NY (US)

( * ) Notice: Subject to any disclaimer, the term of this patent is extended or adjusted under 35 U.S.C. 154(b) by 353 days.

(21) Appl. No.: 16/346,174

(22) PCT Filed: Dec. 7, 2017

(86) PCT No.: PCT/IB2017/057722
§ 371 (c)(1),
(2) Date: Apr. 30, 2019

(87) PCT Pub. No.: WO2018/104901
PCT Pub. Date: Jun. 14, 2018

(65) Prior Publication Data
US 2019/0257455 A1    Aug. 22, 2019

Related U.S. Application Data

(60) Provisional application No. 62/432,281, filed on Dec. 9, 2016.

(51) Int. Cl.
| | |
|---|---|
| *B25B 27/10* | (2006.01) |
| *F16L 37/088* | (2006.01) |
| *F16H 57/04* | (2010.01) |
| *F16L 37/12* | (2006.01) |

(52) U.S. Cl.
CPC .......... *F16L 37/0885* (2019.08); *B25B 27/10* (2013.01); *F16H 57/042* (2013.01); *F16H 57/0412* (2013.01); *F16L 37/1225* (2013.01); *F16L 2201/10* (2013.01)

(58) Field of Classification Search
CPC ..................................................... B25B 27/10
USPC ......................................................... 81/177.8
See application file for complete search history.

(56) References Cited

U.S. PATENT DOCUMENTS

| | | |
|---|---|---|
| 5,749,606 A | 5/1998 | Lu et al. |
| 6,058,598 A | 5/2000 | Dixon et al. |
| 6,164,106 A * | 12/2000 | Nghiem ................ B21D 39/04 29/720 |

(Continued)

FOREIGN PATENT DOCUMENTS

| | | |
|---|---|---|
| CN | 102735278 | 10/2012 |
| GB | 2524738 | 10/2015 |

(Continued)

*Primary Examiner* — David B. Thomas
*Assistant Examiner* — Jonathan G Santiago Martinez
(74) *Attorney, Agent, or Firm* — Simpson & Simpson, PLLC; Michael Nicholas Vranjes

(57) ABSTRACT

A tool for installing an assurance cap on a fluid connector assembly, the fluid connector assembly including a connector body including a resilient clip and a tubular member operatively arranged to be connected in the connector body, the tool including an annular groove arranged to engage an end of the assurance cap and a proximity sensor operatively arranged to detect the position of the tool relative to the connector body.

11 Claims, 17 Drawing Sheets

(56) References Cited

U.S. PATENT DOCUMENTS

| | | | |
|---|---|---|---|
| 7,104,163 B2 * | 9/2006 | Hu | B25B 13/06 |
| | | | 81/121.1 |
| 7,225,706 B2 * | 6/2007 | Kassabian | B25B 25/005 |
| | | | 29/243.56 |
| 8,427,179 B2 | 4/2013 | Chamberlin | |
| 8,528,385 B2 | 9/2013 | Raghavendra et al. | |
| 8,783,732 B2 | 7/2014 | Smith et al. | |
| 8,813,348 B2 | 8/2014 | Williams et al. | |
| 8,997,325 B2 | 4/2015 | Williams et al. | |
| 9,080,922 B2 | 7/2015 | Howard et al. | |
| 2013/0175795 A1 * | 7/2013 | Taylor | F16L 37/0885 |
| | | | 285/45 |
| 2014/0339814 A1 | 11/2014 | Alpert et al. | |
| 2015/0101165 A1 | 4/2015 | Williams et al. | |
| 2015/0101173 A1 | 4/2015 | Hartmann | |
| 2015/0209869 A1 * | 7/2015 | Kume | B23B 31/1071 |
| | | | 279/4.12 |
| 2015/0233502 A1 | 8/2015 | Williams et al. | |
| 2015/0252922 A1 * | 9/2015 | Anton | F16L 19/0283 |
| | | | 285/93 |
| 2015/0345684 A1 | 12/2015 | Kujawski, Jr. | |
| 2016/0298796 A1 | 10/2016 | Anton et al. | |
| 2017/0114935 A1 | 4/2017 | Kujawski, Jr. et al. | |

FOREIGN PATENT DOCUMENTS

| | | | |
|---|---|---|---|
| WO | WO-9703314 A1 * | 1/1997 | F16L 37/0915 |
| WO | WO2015/184363 | 12/2015 | |

* cited by examiner

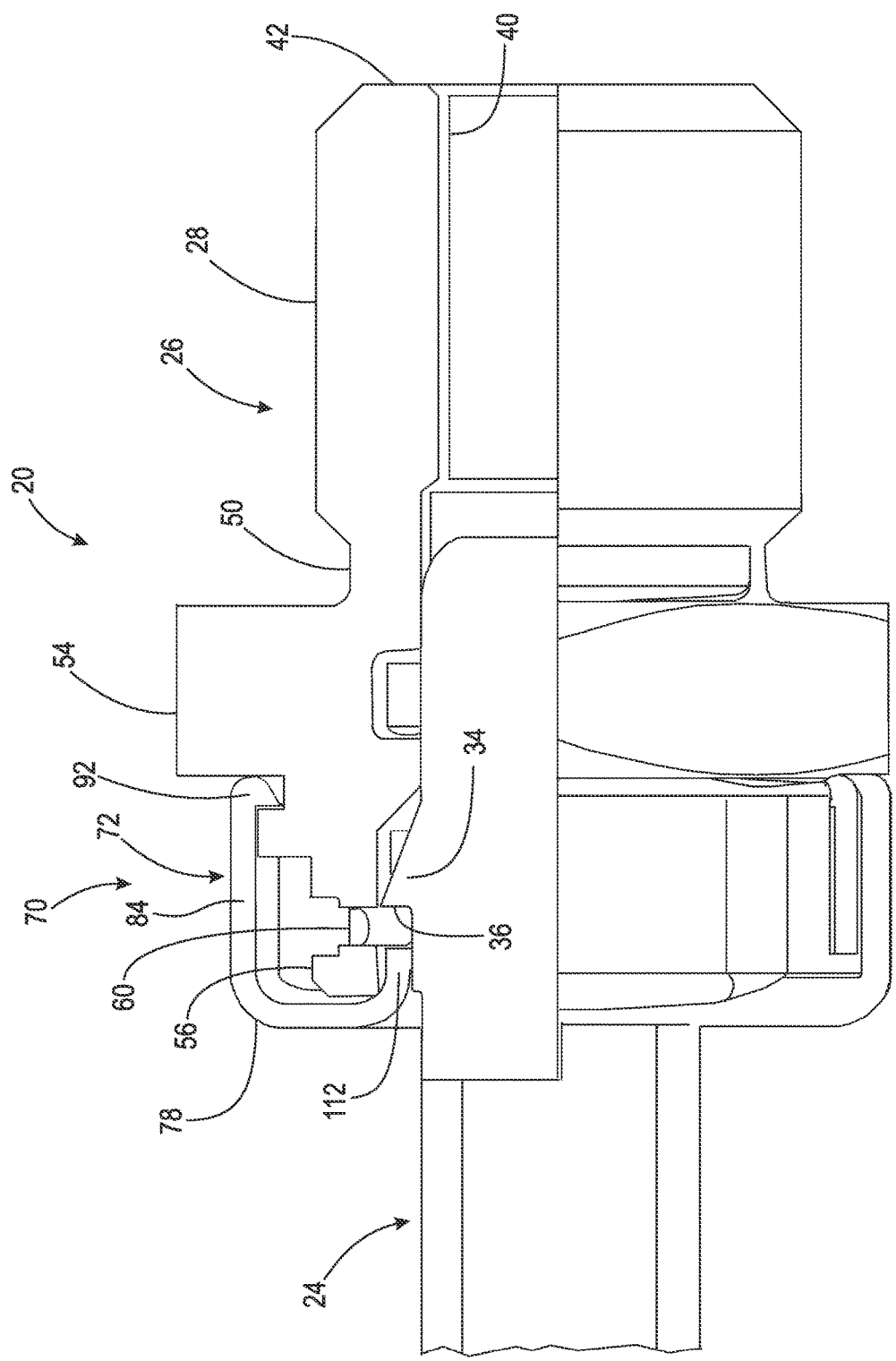

METHOD AND APPARATUS FOR INSTALLING AN ASSURANCE CAP ONTO A FLUID CONNECTOR USING OPTICAL AND INDUCTION SENSORS

CROSS-REFERENCE TO RELATED APPLICATIONS

The present application is the United States National Stage Application pursuant to 35 U.S.C. § 371 of International Patent Application No. PCT/IB2017/057722, filed on Dec. 7, 2017, which application claims priority to U.S. Provisional Application No. 62/432,281, filed on Dec. 9, 2016, which applications are incorporated herein by reference in their entireties.

FIELD

The present disclosure relates to fluid connectors including a fluid carrying tubular member, which is coupled to a fitting body connected to a receptacle, which uses the fluid. More particularly, the disclosure relates to a method and apparatus for installing an assurance cap onto a fluid connector using optical and induction sensors. In an automotive application, the fluid carrying components are connected at one end to an automatic transmission and at another end to a cooler disposed within a vehicle radiator.

BACKGROUND

Quick connectors typically include a resilient clip carried on the fitting body which is adapted to snap behind a raised shoulder of the tubular member when the tubular member is fully inserted into the fitting body to lock the tubular member in place.

Assurance caps can be used to ensure full insertion of the tubular member in the body. Such assurance caps are carried by the tubular member and slide over one end of the body and the resilient clip. If the tubular member is not fully inserted in the body such that the resilient clip is not seated below the shoulder on the tubular member, raised portions of the resilient clip extend outward from one end of the body and interfere with the complete movement of the assurance cap to its fully installed position thereby providing an indication to the installer that the tubular member is not fully latched in the body.

SUMMARY

According to aspects illustrated herein, there is provided a fluid connector assembly, comprising a tubular member including a tapered surface spaced from a first insertion end defining a radially extending shoulder, a fitting body including a bore for receiving the tubular member, a resilient clip arranged on the body and extending partially into the bore to engage the radially extending shoulder to lock the tubular member in the fitting body when the insertion end is fully inserted into the bore, and an assurance cap arranged on the tubular member, the assurance cap including one or more latch fingers operatively arranged to engage with a latch groove formed in the fitting body to latch the assurance cap on the fitting body only when the tubular member is in the fully inserted position in the fitting body.

According to aspects illustrated herein, there is provided a fluid connector assembly comprising a tubular member having a tapered surface spaced from a first insertion end defining a radially extending shoulder, a fitting body having a bore for receiving the tubular member, a resilient clip mounted on the body and extending partially into the bore to engage the shoulder of the tubular member to lock the tubular member in the fitting body when the insertion end of the tubular member is fully inserted into the bore in the housing, and an assurance cap slidably mounted on the tubular member, the assurance cap having latch fingers configured for latching with a latch groove formed in the fitting body to latch the assurance cap on the fitting body only when the tubular member is in the fully inserted position in the fitting body.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIGS. 3 through 8D are views showing details of the assurance cap of FIG. 2;

FIGS. 14A and 14B depict another variation in the structure of an assurance cap; and, FIGS. 15A and 15B are views illustrating a tool used to install an assurance cap onto a fluid connector.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly,"

"about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
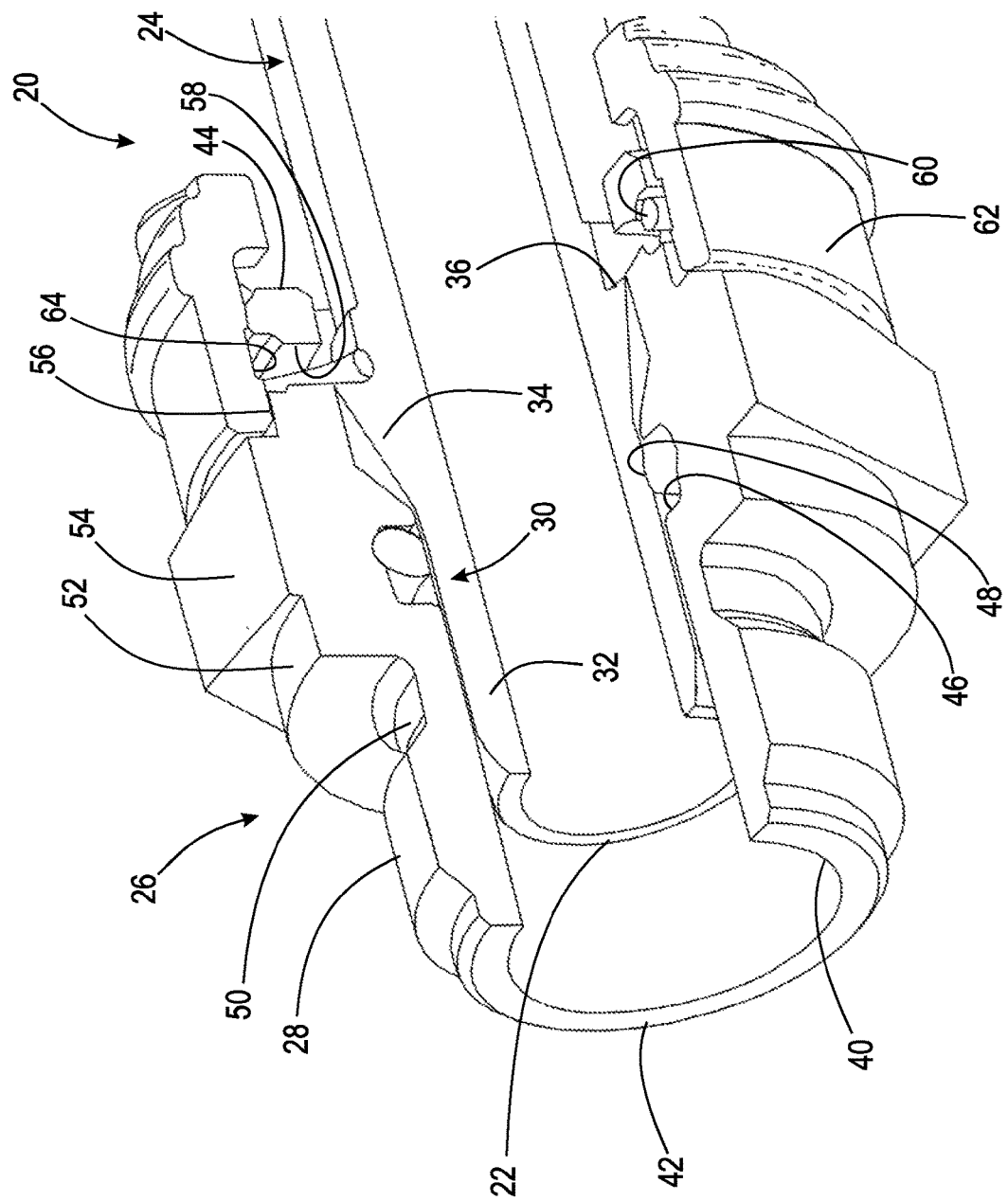
FIG. 1 is a perspective view of a prior-art fluid connector.

Referring now to FIG. 1, there is depicted prior art fluid connector 20, which locks one end 22 of tubular member 24 in connector body 26, which is itself removably mountable in a port, such as by engagement of external threads 28 on one end of body 26 with internal threads in the port.

Tubular member 24 is generally made of a metallic material, but rigid plastic material may also be employed. Tubular member 24 has a generally constant diameter extending from first end 22.

Head section 30 extends from first end 22 at first diameter portion 32 to outward extending tapered portion 34, which terminates at a large diameter end of radially outward extending shoulder 36.

Connector body 26 can be, but is not necessarily, integrally made from a single piece of metallic or plastic material. Body 26 has through bore 40 extending from first end 42 to an opposite second end 44. Bore 40 need not have a constant diameter between first and second ends 42 and 44. Annular internal groove 46 is formed in body 26 intermediate first and second ends 42 and 44 and receives seal member 48, such as a O-ring, for sealing tubular member 24 to body 26 and to prevent fluid leakage therebetween.

As described above, body 26 has externally threaded end portion 28 spaced from first end 42. Recessed radially inward extending groove 50 can be formed in certain applications adjacent one end of threaded section 28 and continuous annular collar 52 to receive a washer (not shown). Hexagonal outwardly projecting portion 54 is formed adjacent annular collar 52. Reduced diameter receiving portion 56 having a generally constant diameter extends from one end of hexagonal portion 54 to second end 44 of body 26. Recessed, outward opening, annular groove 58 is formed in receiving portion 56. Groove 58 has a constant closed inner end facing bore 40 in body 26, which is interrupted by one or more circumferentially spaced slots.

Resilient clip 60 is mounted in groove 58. Resilient clip 60 can be, but need not necessarily be formed of a single piece of spring wire. Resilient clip 60 can be formed with inwardly extending protrusions, which project through the slots in groove 58, when resilient clip 60 is in a relaxed state behind shoulder 36 on tubular member 34 to lock tubular member 24 to connector body 26.

When first end 22 of tubular member 24 is inserted into receiving portion 56 of body 26, first end 22 and head portion 32 of tubular member 24 slide through receiving portion 56 toward first end 42 of body 26. The inward extending protrusions on resilient clip 60 seated in groove 58 slide along tapered portion 34 on tubular member 24 causing resilient clip 60 to expand radially outward moving the protrusions on resilient clip 60 out of bore 40 until shoulder 36 on outward tapered portion 34 of tubular member 24 slides past one end of the resilient clip. At this point, the protrusions on resilient clip 60 snap radially inward behind shoulder 36 locking tubular member 24 in body 26. Also at this point during the insertion process, the outermost portions of resilient clip 60 are fully contained within groove 58 below the outer surface of receiving portion 56 of body 26.

A prior art assurance cap 62 shown in FIG. 1, carried on tubular member 24, can then be slid over receiving portion 56 of body 26. Assurance cap 62 includes inward opening recess 64, which is positioned between the ends of assurance cap 60 to overlay the outer portions of resilient clip 60 when resilient clip 60 is in the fully seated position in groove 58 behind shoulder 36 of tubular member 24. This provides the installer with a visual indication that tubular member 24 is fully inserted and seated in body 26 in a fluid sealed position.

In the event that tubular member 24 is not fully inserted into body 26 such that it is not in the position shown in FIG. 1, the outer portions of resilient clip 60 will have been pushed radially outward into an expanded state as clip 60 rides up along tapered outer surface portion 34 of tubular member 24. The outer tips of the outer portions of the resilient clip then extend outward beyond the outer surface of receiving portion 56 of body 26 in an interfering position with the sliding movement of assurance cap 62. This interference prevents assurance cap 62 from being slid fully forward such that recess 64 cannot snap over resilient clip 60. Since assurance cap 62 is therefore not in a fully forward position, the installer has a visual indication that tubular member 24 is not fully inserted into body 26.

Figure 2:
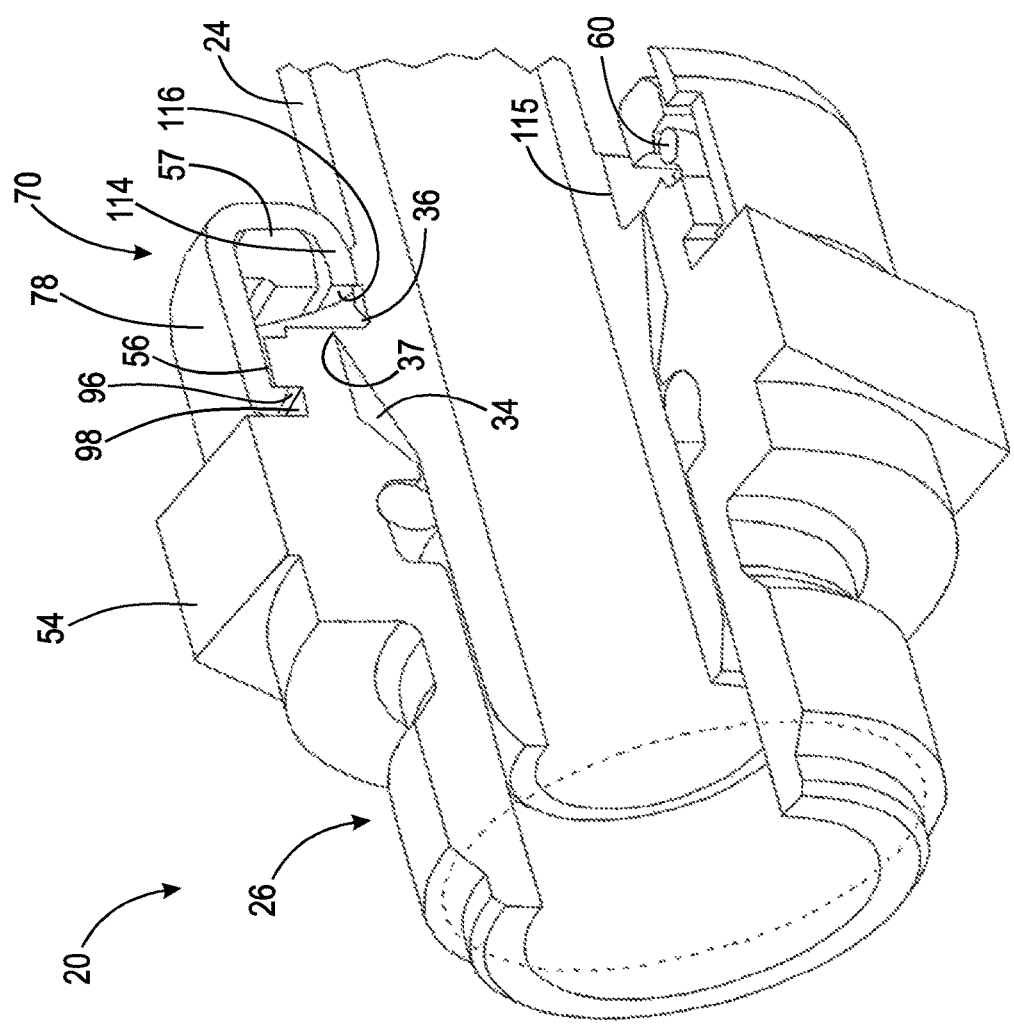
FIG. 2 is a view similar to FIG. 1 showing the same fluid connector but with an assurance cap in accordance with the present invention.
Figure 3:
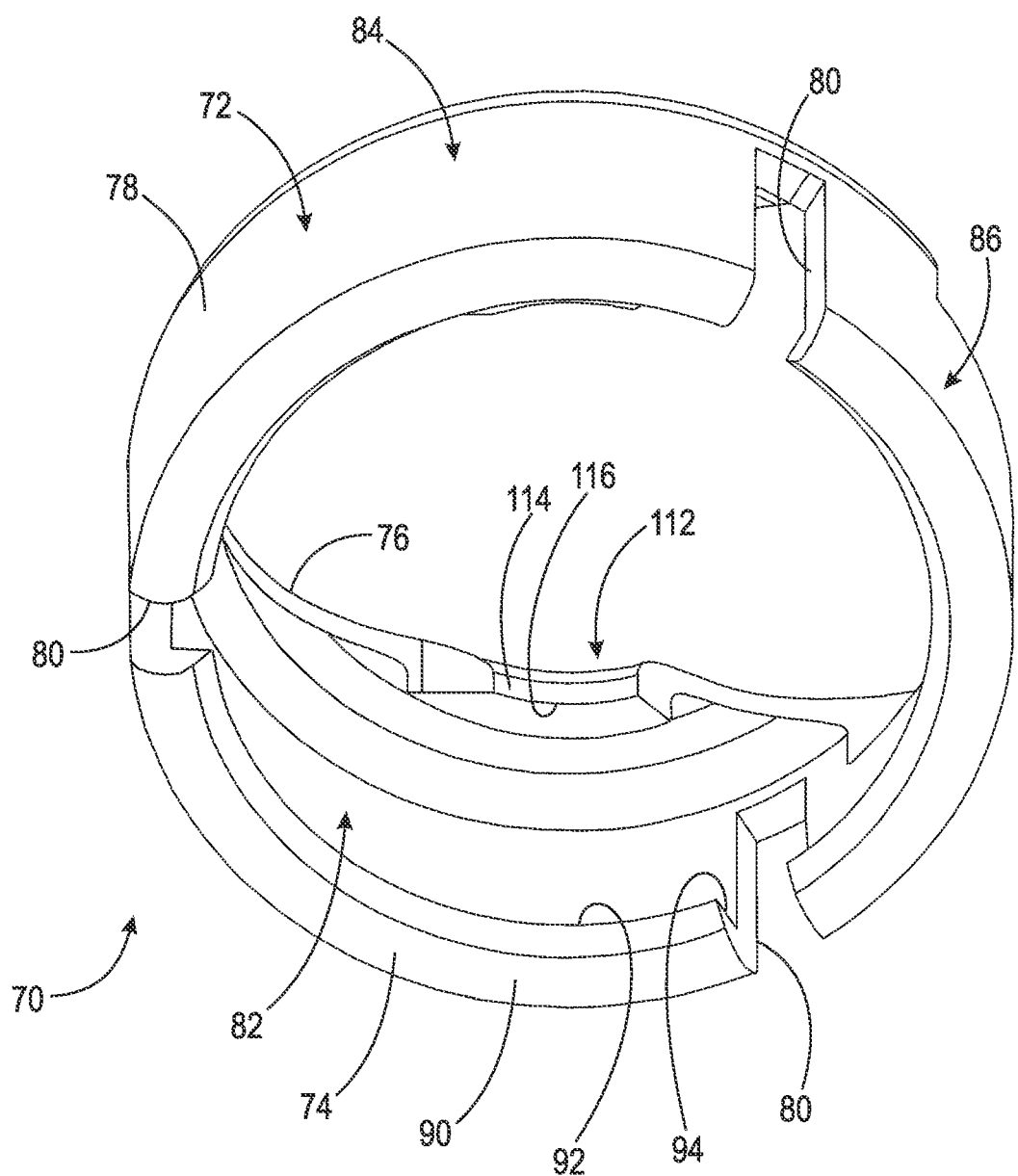
Figure 4:
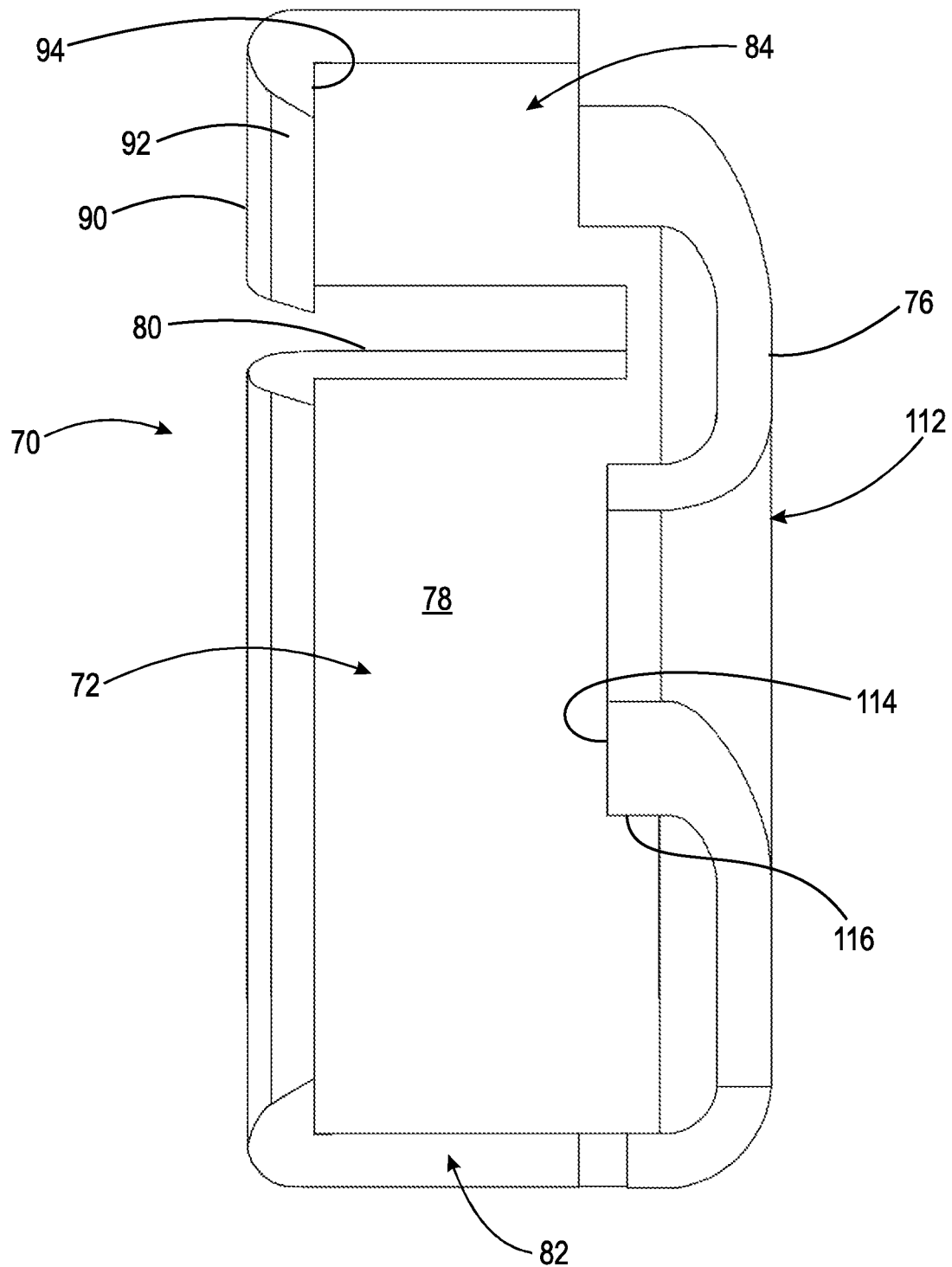
Figure 5:
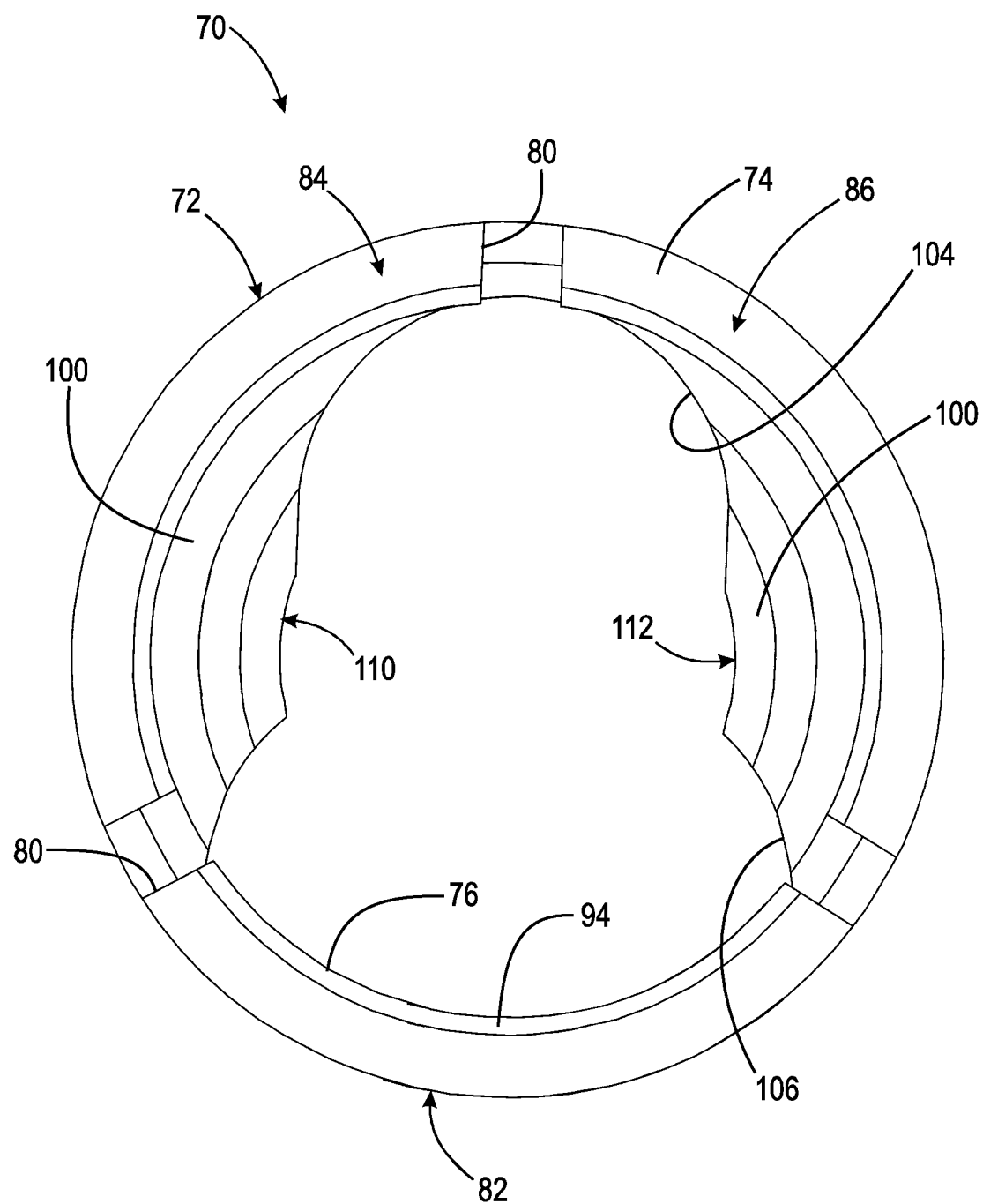
Figure 6:
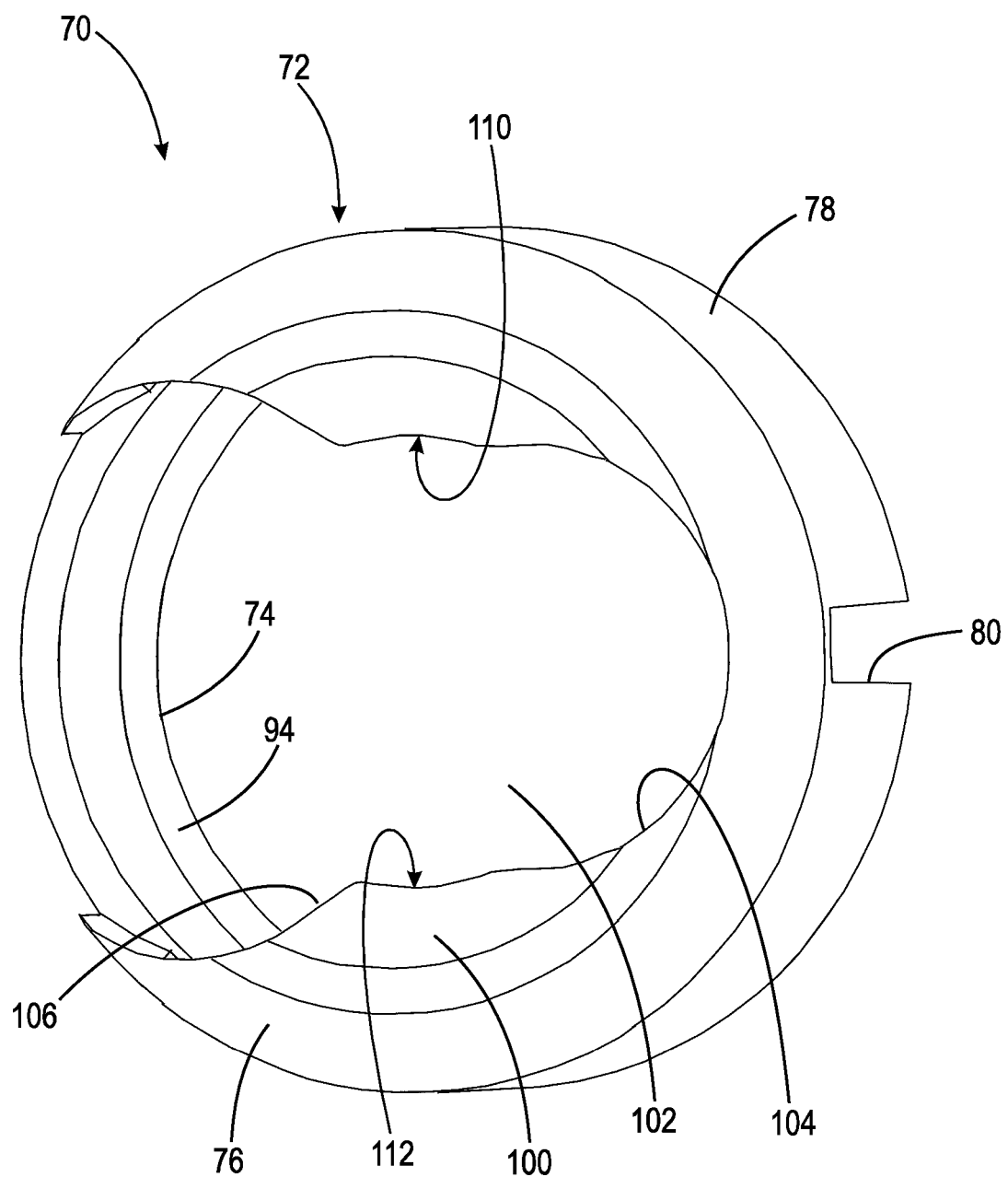

FIG. 2 depicts the same fluid connector 20, which is used to sealingly lock tubular member 24 to body 26. However, third connector 20 in FIG. 2 includes novel assurance cap 70, which provides assurance of a full insertion of tubular member 24 into body 26 and, at the same time, provides secondary latches to hold assurance cap 70 on body 26 and to provide an additional latching force preventing disengagement of tubular member 24 from body 26.

Assurance cap 70, shown in an assembled position in FIG. 2 and in detailed views in FIGS. 3-7 and FIGS. 8A-8D, can be formed of a material having a suitable strength, such as high strength plastic, or a metal, such as stainless steel, aluminum, etc.

In this aspect, assurance cap 70 is in the form of annular body 72 having first end 74, opposed second end 76, and intermediate sidewall 78 extending between first and second ends 74 and 76. At least one or a plurality of slots 80, with three slots 80 shown by example are formed through first end 74 and a portion of sidewall 78 to separate sidewall 78 into a plurality of fingers with three fingers 82, 84, and 86 being shown by example in FIGS. 3-7. Slots 80 and intervening fingers 82, 84, and 86 provide flexibility to assurance cap 70 allowing first end 74 of assurance cap 70 to flex radially outward over the outer surface of receiving portion 56 of body 26 until assurance cap 70 has reached its fully forward position of movement, as described hereafter.

First end 74 of each of fingers 82, 84, and 86 has rounded over end portion 90, which terminates in radially inward extending edge 92 forming shoulder 94. Shoulder 94 is configured to snap over and engage mating shoulder 96 formed along one side of open ended annular groove 98 formed in body 26 between hexagonal portion 54 and receiving portion 56 of body 26. Shoulders 94 on each of three fingers 82, 84, and 86, which extend over substantially the entire circumference of assurance cap 70, provide a secure circumferential secondary latching force to secure assurance cap 70 on body 26 as well as providing additional latching force to resist separation of tubular member 24 from body 26.

Second end 76 of assurance cap 70 has a partially closed, irregularly shaped endwall 100, which includes a keyhole shaped aperture 102 having a reduced diameter or width first end portion 104 and a larger diameter second end portion 106. The walls forming first portion 104 and second portion 106 are generally arcuate to enable assurance cap 70 to be mounted over first end 22 of tubular member 24 as described hereafter and shown in FIGS. 8A-8D.

Generally centrally in endwall 100 on second end 76 of assurance cap 70, a pair of diametrically opposed, inward extending fingers 110 and 112 are provided. Fingers 110 and 112, with only finger 112 shown in FIG. 3, have inward curled wall 114 terminating in inner edge wall 116. As shown in FIG. 2, inner wall 114 is generally parallel to outer sidewall 78 of assurance cap 70, with inner edge 116 facing, but spaced from resilient clip 60.

Inner walls 114 will rest on raised bead 115 on tubular member 24 extending from shoulder 36 at the fully inserted position of tubular member 24 in body 26.

Fingers 110 and 112 provide an additional engagement or latching function for assurance cap 70 on body 20 when assurance cap 70 is in the fully forward, latched position shown in FIG. 2.

Figure 8A:
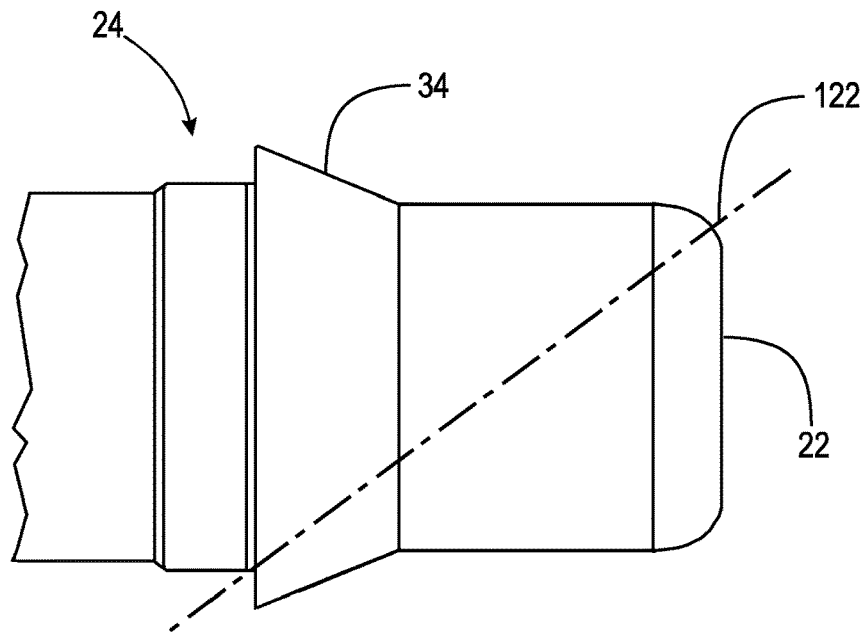
Figure 8B:
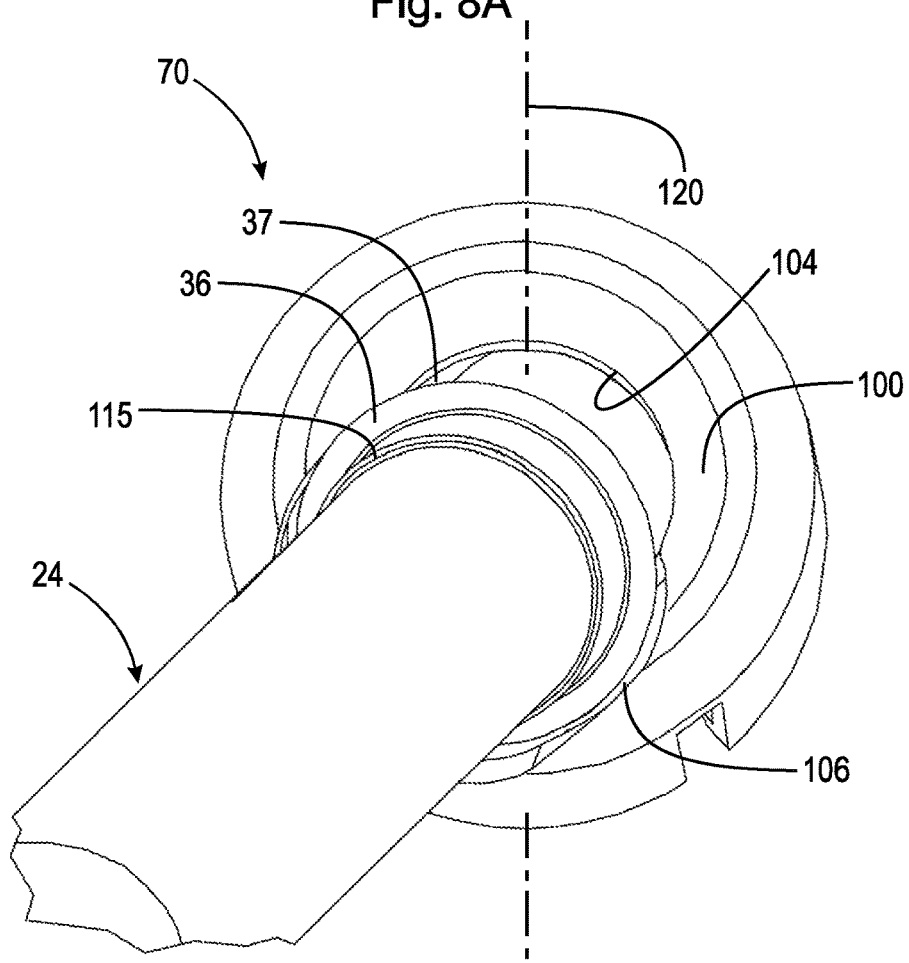

FIGS. 8A-8D depict the orientation of tubular member 24 and assurance cap 70 for mounting of assurance cap 70 over first end 22 of tubular member 24 and tapered surface 34. At the time of assembly, assurance cap 70 is oriented as shown in FIG. 8B with longitudinal axis 120 extending through the keyhole shaped aperture 102 oriented at an angle along axis line 122 of tubular member 24 in FIG. 8A to bring the larger diameter or width second end portion 106 of the keyhole shaped aperture 102 over large diameter end portion 37 of tapered portion 34 of tubular member 24.

Figure 8C:
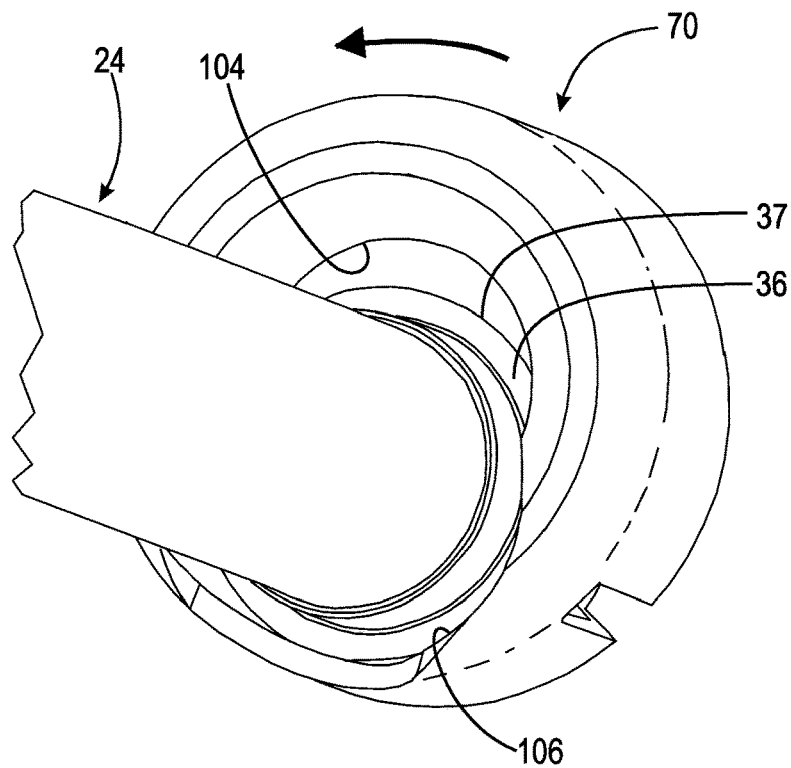

The other end of assurance cap 70 can then be pivoted in the direction of arrow 124 in FIG. 8C to move the entire keyhole shaped opening 102 over large diameter end portion 37 of tapered portion 34 of tubular member 24 until first end 74 of assurance cap 70 clears large diameter end portion 37 of tapered surface 34 of tubular member 24.

Figure 8D:
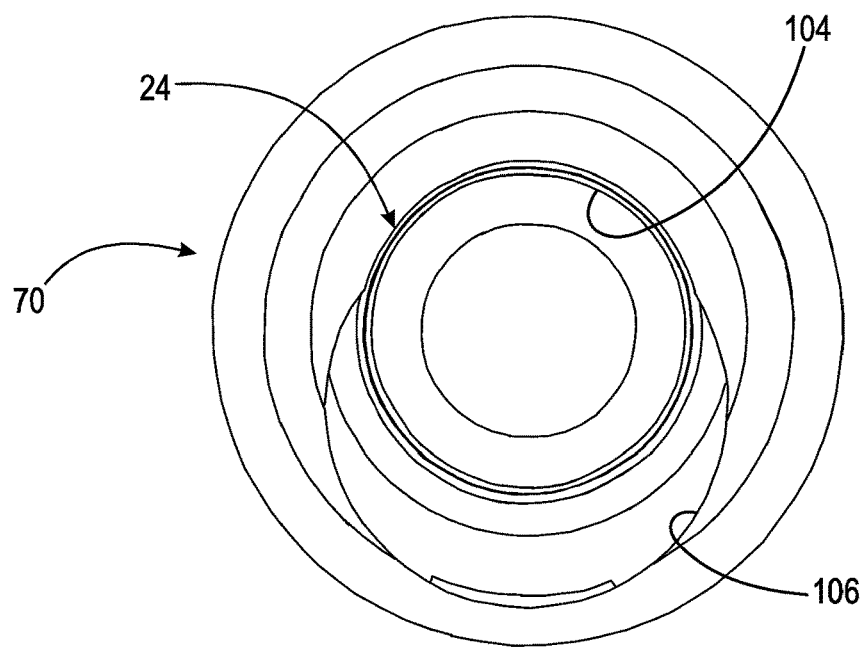

After large diameter end portion 37 of tapered portion 36 of tubular member 24 has been urged past the inner edges of large diameter end 106 of key hole aperture 102 in assurance cap 70, cap 70 can be tilted upward toward a perpendicular orientation with respect to a longitudinal axis of tubular member 24 and moved longitudinally along tubular member 24 until the inner edges of keyhole shaped aperture 102 are completely past large diameter end portion 37 of tapered portion 36 of tubular member 24, as shown in FIG. 8C. Assurance cap 70 can then be urged or slid into smaller diameter portion 104 of keyhole shaped aperture 102 to center assurance cap 70 with respect to tubular member 24 as shown in FIG. 8D.

Figure 9B:
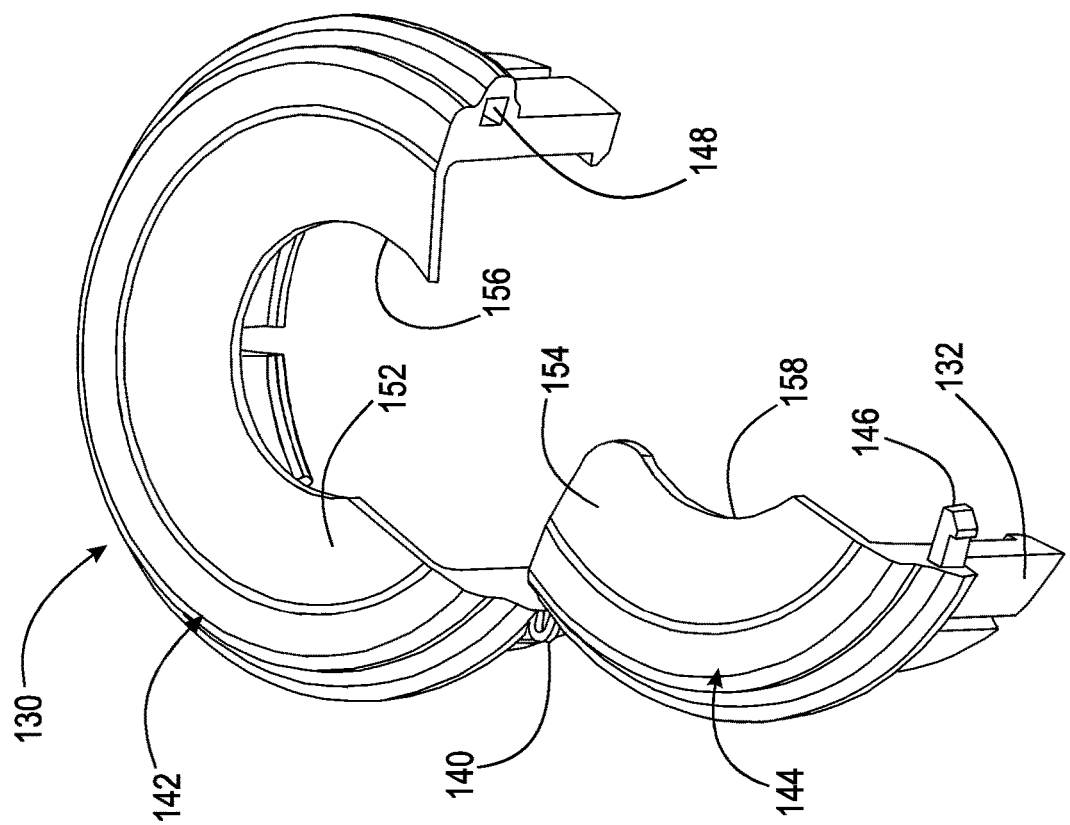
FIGS. 9A through 9C depict another embodiment of the assurance cap which functions in the same manner as that shown in FIGS. 2 through 8D.
Figure 9A:
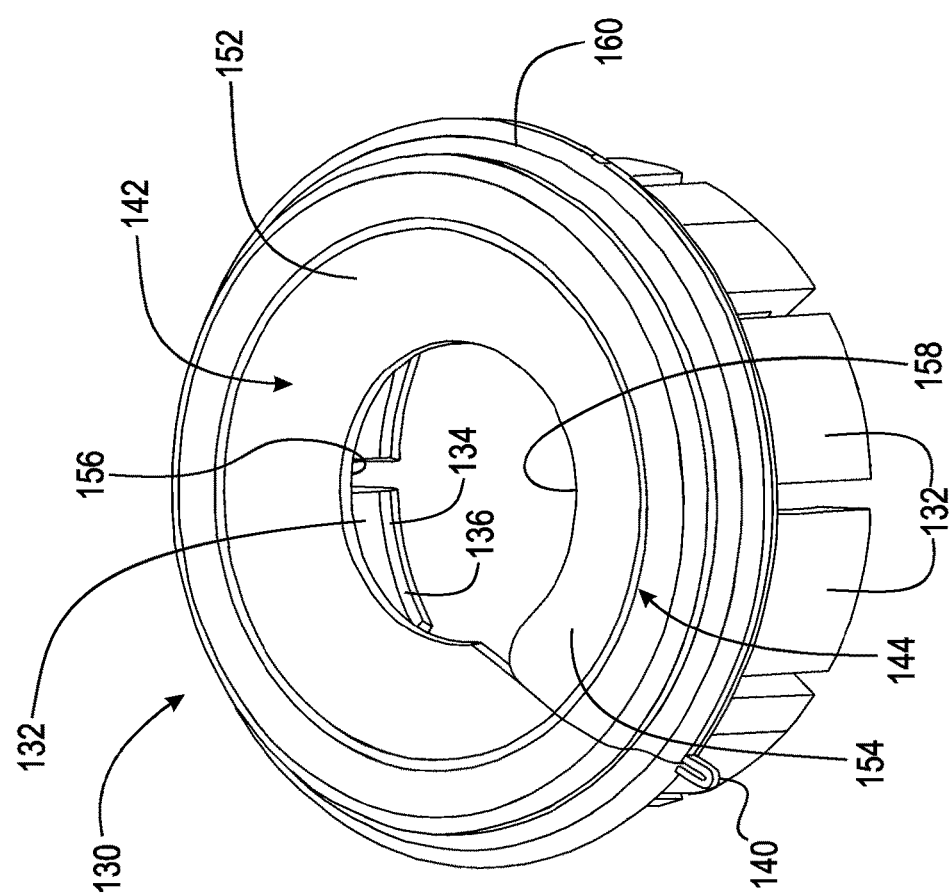
Figure 9C:
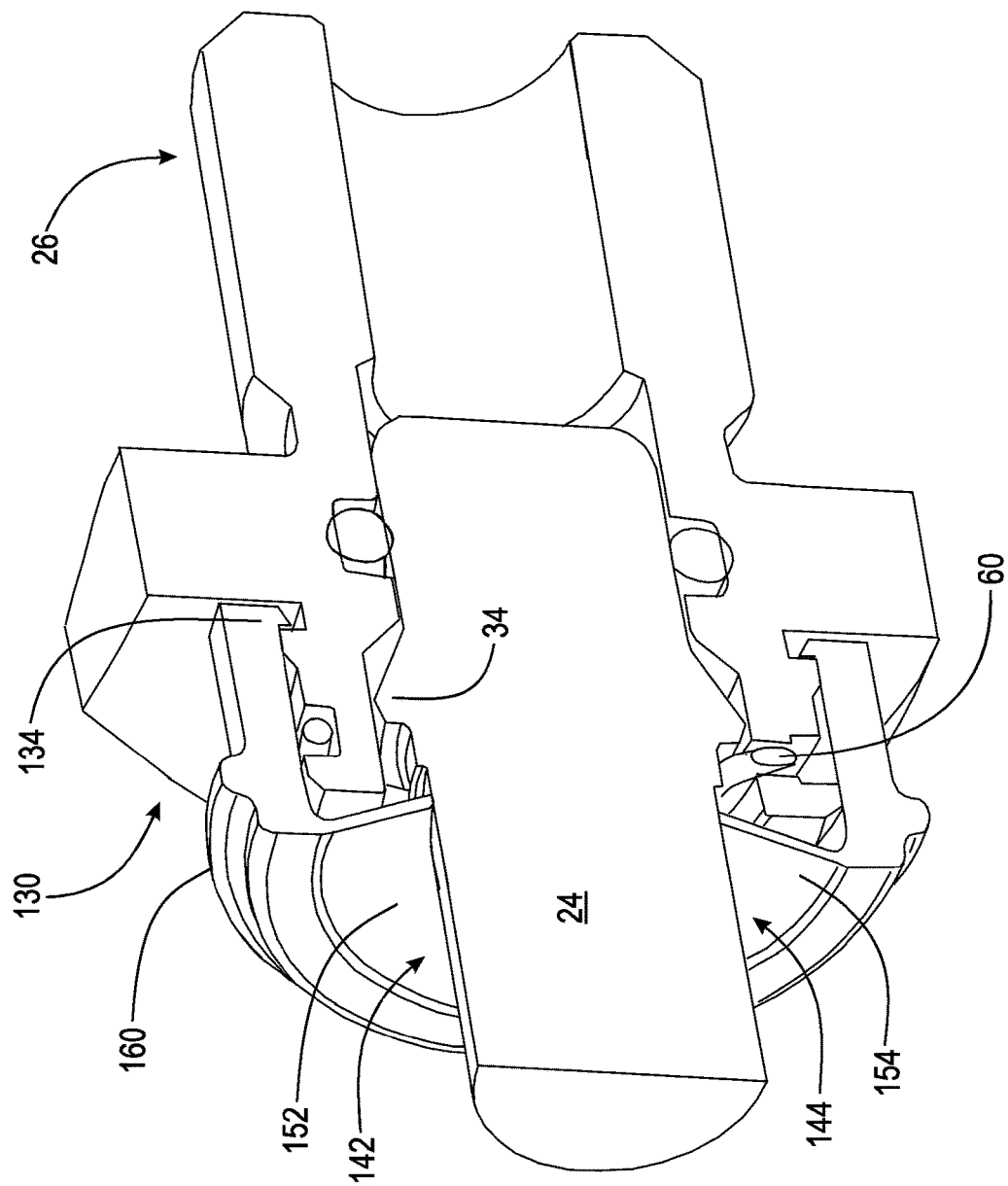

Referring now to FIGS. 9A, 9B, and 9C, there is depicted another aspect of assurance cap 130 which functions in the same manner as assurance cap 70 described above and shown in FIGS. 1-8D. Assurance cap 130 has a plurality of longitudinally extending, spaced fingers 132, each with radially inward extending edge 134 terminating in shoulder 136 configured to latchably engage edge 96 of groove 98 in body 20 to secure assurance cap 130 in position at its forward most position of movement relative to tubular member 24 and body 26. It should be noted that instead of three larger length arcuate fingers 82, 84, and 86, fingers 132 in assurance cap 130 are smaller in length and greater in number to provide a slightly greater degree of flexibility to enable assurance cap 130 to be easily slid over the raised end of receiving portion 56 of body 26.

Assurance cap 130 has a one piece unitary body with hinge 140 interconnecting one portion 142 with second portion 144. First and second portions 142 and 144 are pivotally movable with respect to each other about hinge 140 from an open position shown in FIG. 9B which enables assurance cap 130 to be mounted over tubular member 24 to a closed position forming a continuous body about tubular member 24 by pivotal movement of first and second sections 142 and 144 toward each other about hinge 140 until latch finger 146 on second portion 144 engages latch recess 148 in the opposite first portion 142 as shown in FIG. 9B. The engagement of latch finger 146 in latch recess 148 locks the two portions of 142 and 144 of assurance cap 130 into a continuous body encircling tubular member 24.

It should also be noted that the second end of assurance cap 130 has a radially inward extending skirt formed of first skirt portion 152 on first portion 142 of assurance cap 130 and second skirt portion 154 on second portion 144 of assurance cap 130. Arcuate inner edges 156 and 158 respectively on skirt portions 152 and 154 form a continuous annular edge configured to engage or be slightly spaced from the outer surface of tubular member 24 when assurance cap 130 is slid to its forward most position over tubular member 24 and latched to body 26 as shown in FIG. 9C. Skirt portions 152 and 154 also act to center assurance cap 130 about tubular member 24 during the forward sliding movement.

Raised annular rib 160 is formed on the outer surface of assurance cap 130 between the first and second ends to act as a gripping surface to facilitate movement of assurance cap 130 from a rest position about tubular member 24 to its forward position shown in FIG. 9C.

Figure 10B:
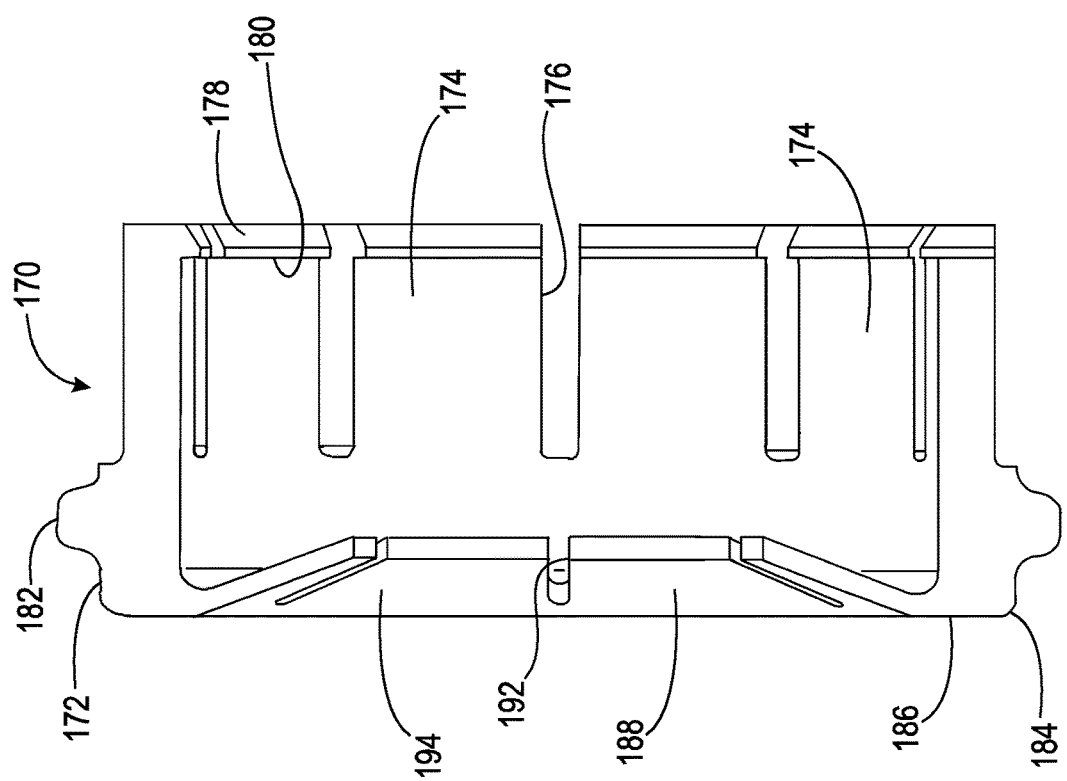
FIGS. 10A and 10B show another embodiment of an assurance cap.
Figure 10A:
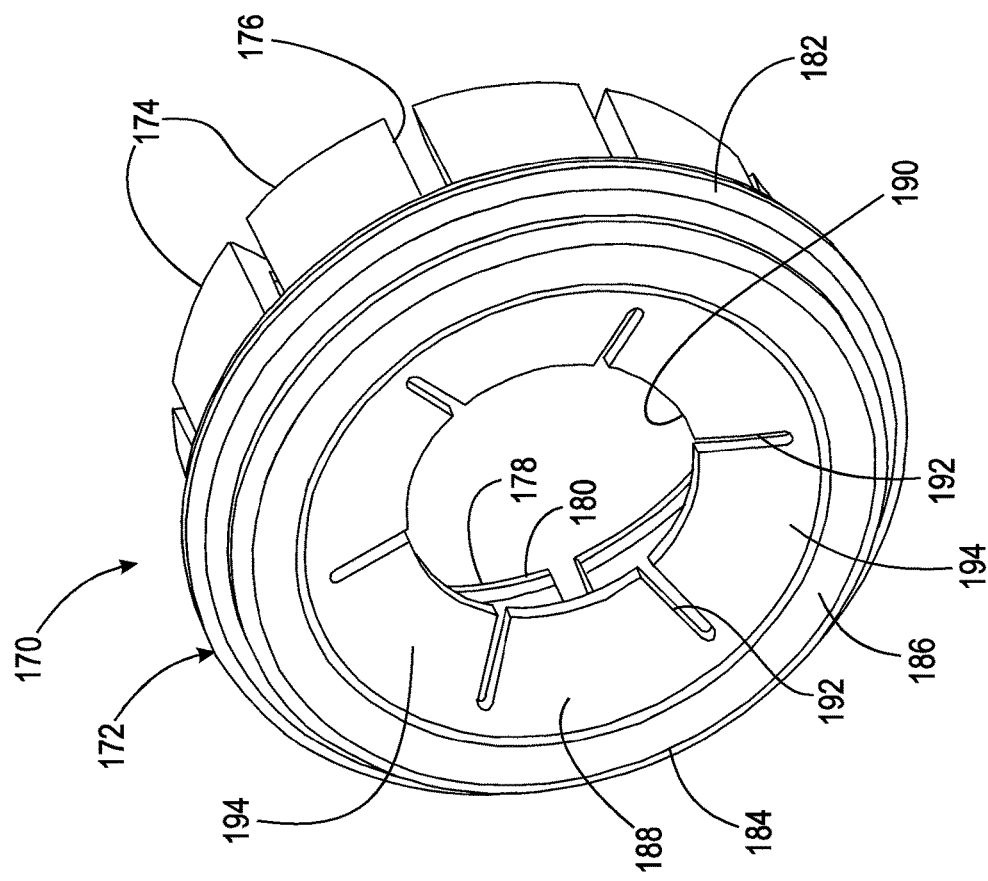

FIGS. 10A and 10B show another modification in assurance cap 170. In this aspect, assurance cap 170 has a one-piece unitary body 172 formed as a closed, annular, one-piece cylindrical-shaped body 172. The first end of body 172 has plurality of fingers 174 spaced apart by longitudinally extending slots 176. Inward extending edges 178 terminating in radially inward extending shoulder 180 extend from one end of each of fingers 174 to engage edge 96 of groove 98 in body 26 to latch assurance cap 170 to body 76 in a forward most position of movement indicating full insertion of tubular member 24 in body 26.

Annular radially outward extending rib 182 is formed intermediate the first end and the opposed second end of body 172 to act as a gripping surface to facilitate movement of assurance cap 170.

Second end 184 of body 172 includes continuous annular outer ring 186 and radially inward conical-shaped skirt 188 extending from outer ring 186 to inner edge 190. A plurality of radially extending slots 192 are formed in skirt 188 and extend from inner edge 190 partially through the radial extent of skirt 188. Slots 192 divide skirt 188 into a plurality of radially inward, conically tapered fingers 194. Slots 192 provide flexibility to fingers 194 to enable assurance cap 170 to be forcibly urged over large diameter end portion 37 of tapered surface 34 on tubular member 24 to mount assurance cap 170 on tubular member 24 prior to insertion of tubular member 24 into fitting body 26.

Figure 11B:
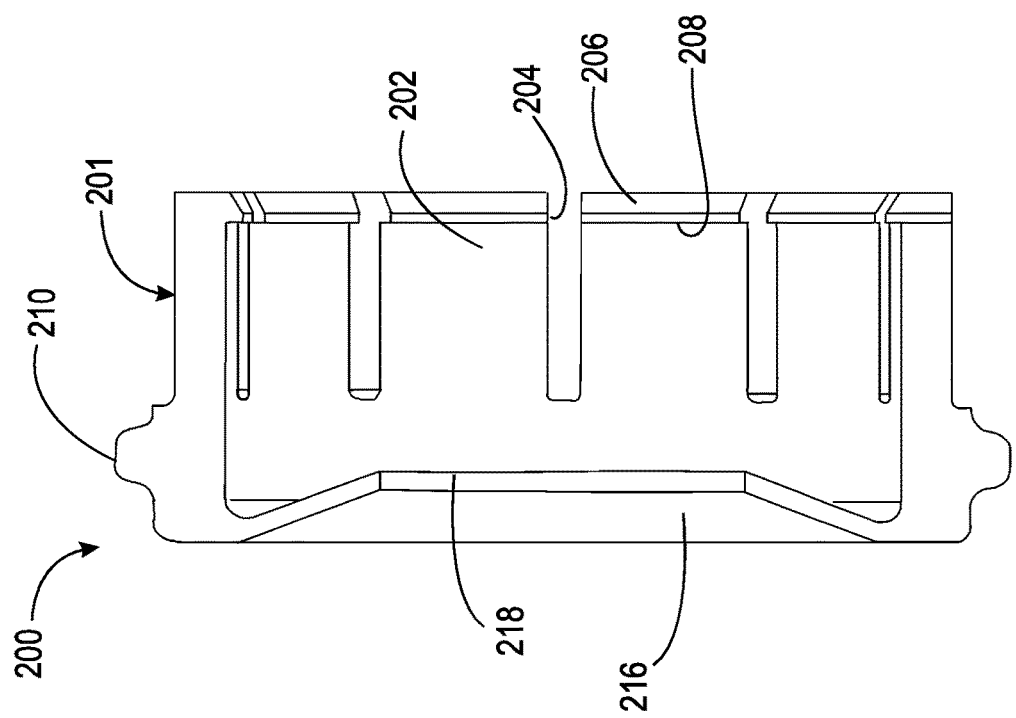
FIGS. 11A and 11B depict another embodiment of an assurance cap, which is similar to the one shown in FIGS. 10A and 10B.
Figure 11A:
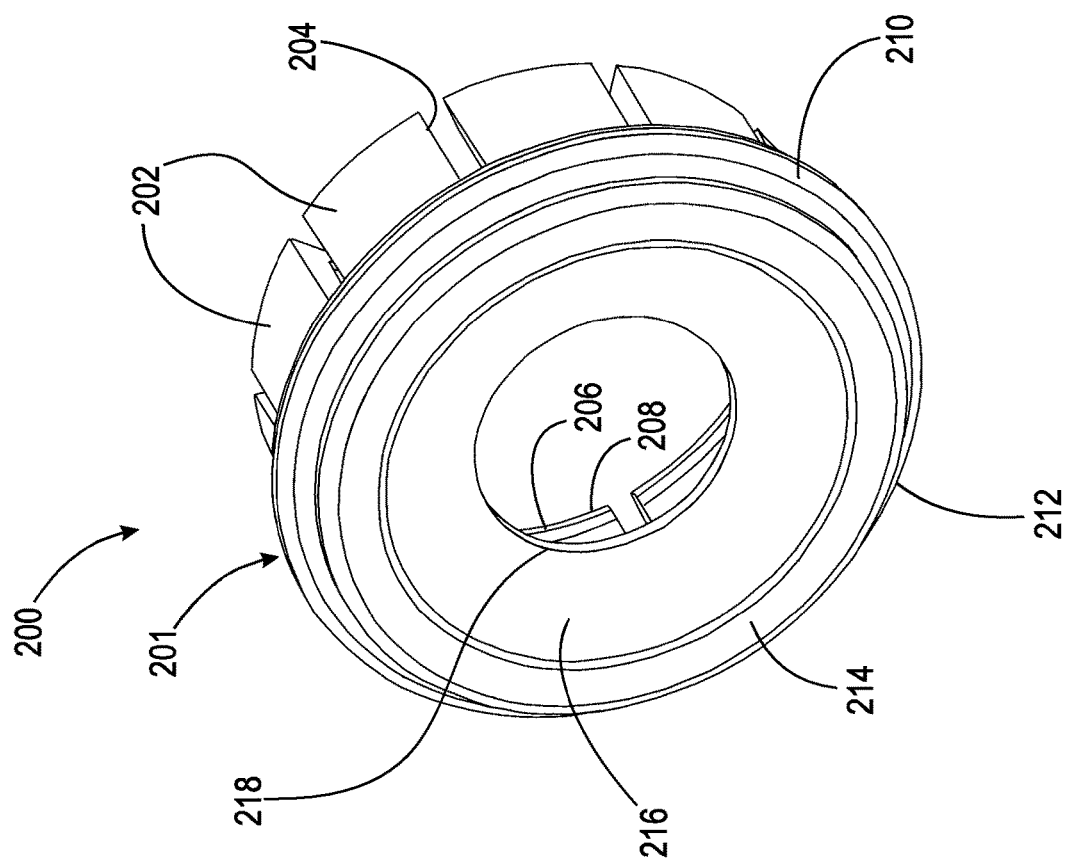

FIGS. 11A and 11B depict another aspect of assurance cap 200, which is substantially similar to assurance cap 170 in that assurance cap 200 is formed of a continuous one-piece body 201 having plurality of fingers 202 at a first end spaced apart by slots 206. Fingers 202 terminate in inward extending edge 206 having inner shoulder 208 to engage edge 96 in groove 98 of fitting body 26 when assurance cap 200 is moved to its forward position relative to fitting body 26 indicating full insertion of tubular member 24 in fitting body 26.

Radially outward extending rib 210 is formed in body 201 intermediate the first and second ends. Second end 212 of body 201 is formed as annular ring 214 from which conically shaped radially inward extending skirt 216 extends to inner edge 218 defining an aperture the same size or slightly larger than the outer diameter of the constant diameter portion of tubular member 24.

In this aspect of assurance cap 200, skirt 216 does not include any slots. However, the material used to form body 201 provides a degree of flexibility to enable assurance cap 200 to be forcibly urged over large diameter end portion 37 of tapered portion 34 on tubular member 24 to movably mount assurance cap 200 on tubular member 24 prior to insertion of tubular member 24 in fitting body 26.

Figure 12B:
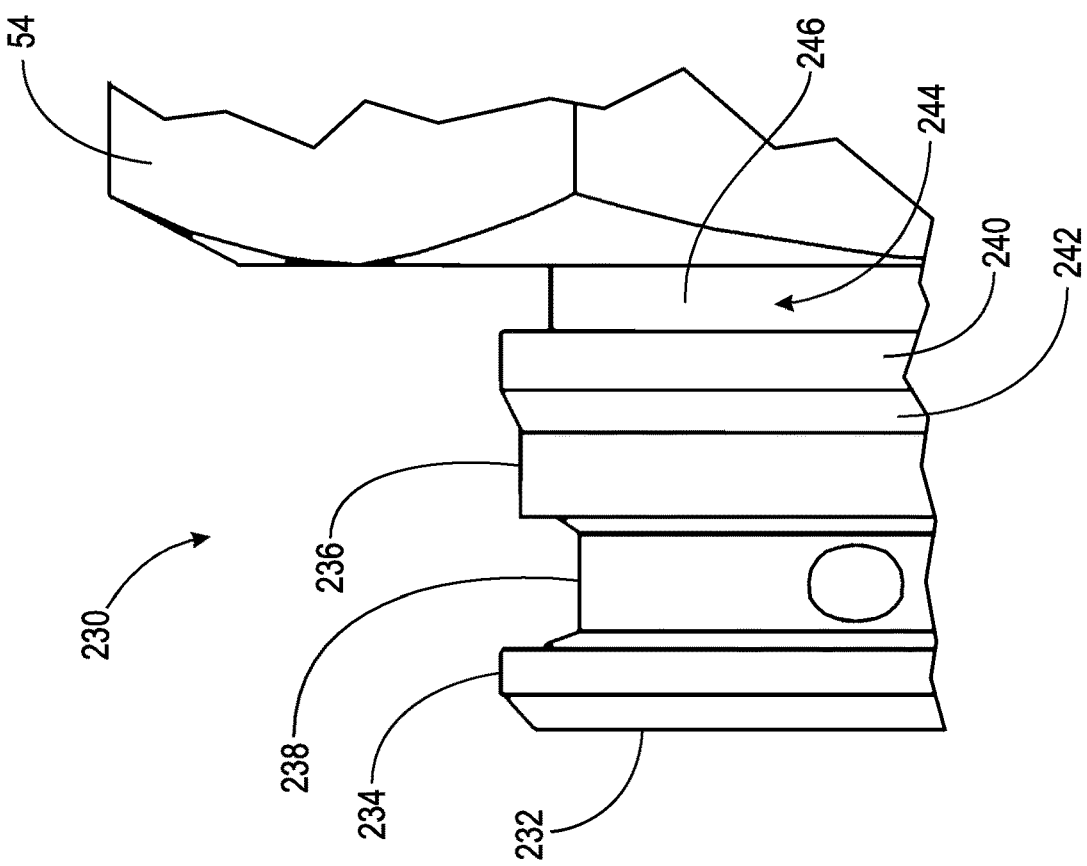
FIGS. 12A and 12B illustrate another aspect of a fitting body which includes variations from the fitting body shown in FIG. 2.
Figure 12A:
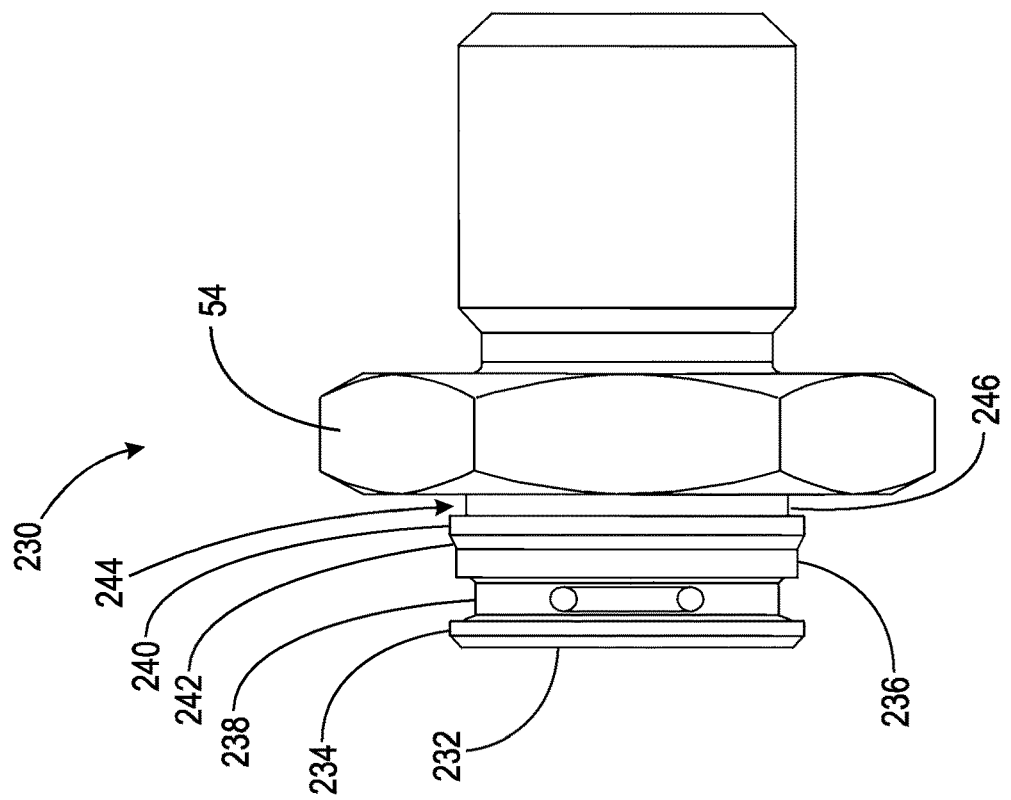

Referring now to FIGS. 12A and 12B, there is depicted another aspect of fitting body 230, which includes variations from fitting body 26 shown in FIG. 2. As most of fitting body 230 is identically constructed as fitting body 26, only variations between fitting body 230 and fitting body 26 will be described in detail.

As shown in fitting body 26 depicted in FIG. 2, receiving portion 56 extending from end 57 of fitting body 26 has a constant outer diameter. This allows radially inward turned edges 92 of fingers 82, 84, and 86 on first end 74 of assurance cap 70 to snap into recessed groove 98 in fitting body 26.

In fitting body 230 depicted in FIGS. 12A and 12B, the receiving portion extending from first end 232 of fitting body 230 has first diameter end portion 234 and second smaller diameter end portion 236 disposed on opposite sides of groove 238, which receives resilient clip 60. Raised intermediate annular ring 240 is formed adjacent to second end portion 236 and includes radially outward extending, conically shaped, tapered endwall 242 extending from second end portion 236. The outer diameter of ring 240 is larger than the diameters of first and second end portions 234 and 236 of the receiving portion of fitting body 230.

Recessed groove 244 is formed between annular ring 240 and hexagonal shaped portion 54 of fitting body 230. Inner surface 246 of groove 244 has a diameter smaller than the diameter of second end portion 236 of the insertion portion of fitting body 230 to define a recess for receiving the latch portions of the fingers of the assurance cap in the fully inserted position relative to fitting body 230.

During such forward sliding movement of any of the assurance caps described above, the radially inward turned fingers of the assurance cap flex outward over tapered endwall 242 and then along the outer surface of ring 240 before snapping in latched engagement with groove 244 to provide the secondary latch function for the assurance cap.

Figure 13B:
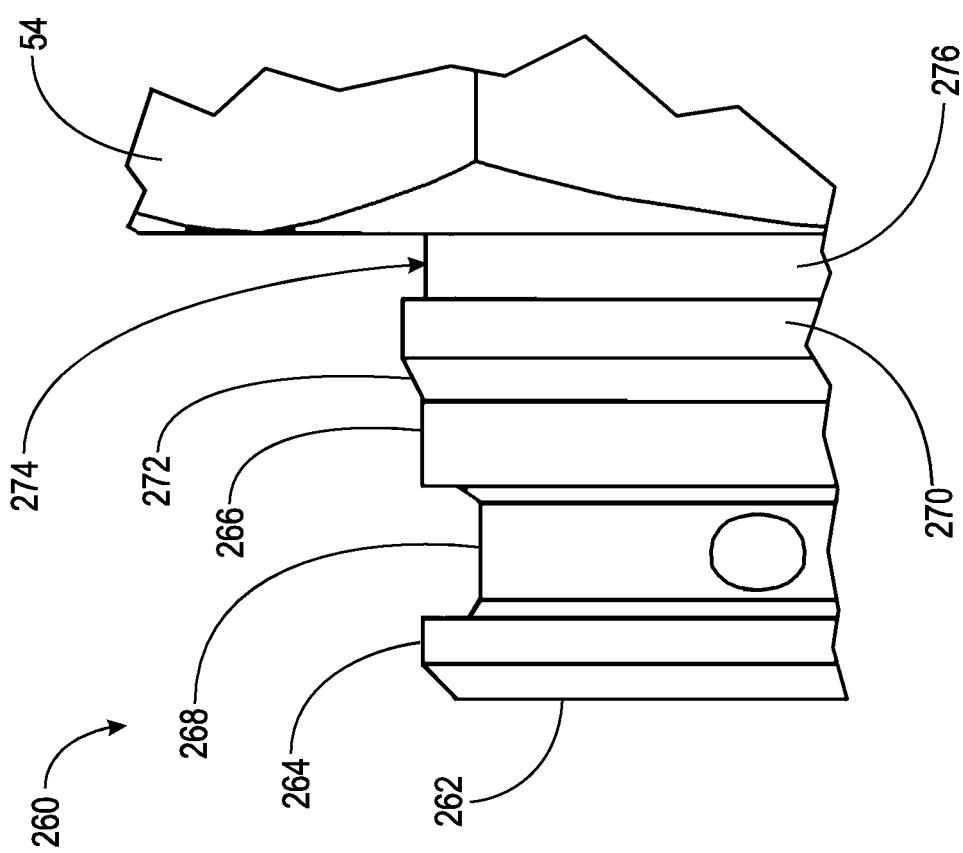
FIGS. 13A and 13B are views of another embodiment of the fitting body.
Figure 13A:
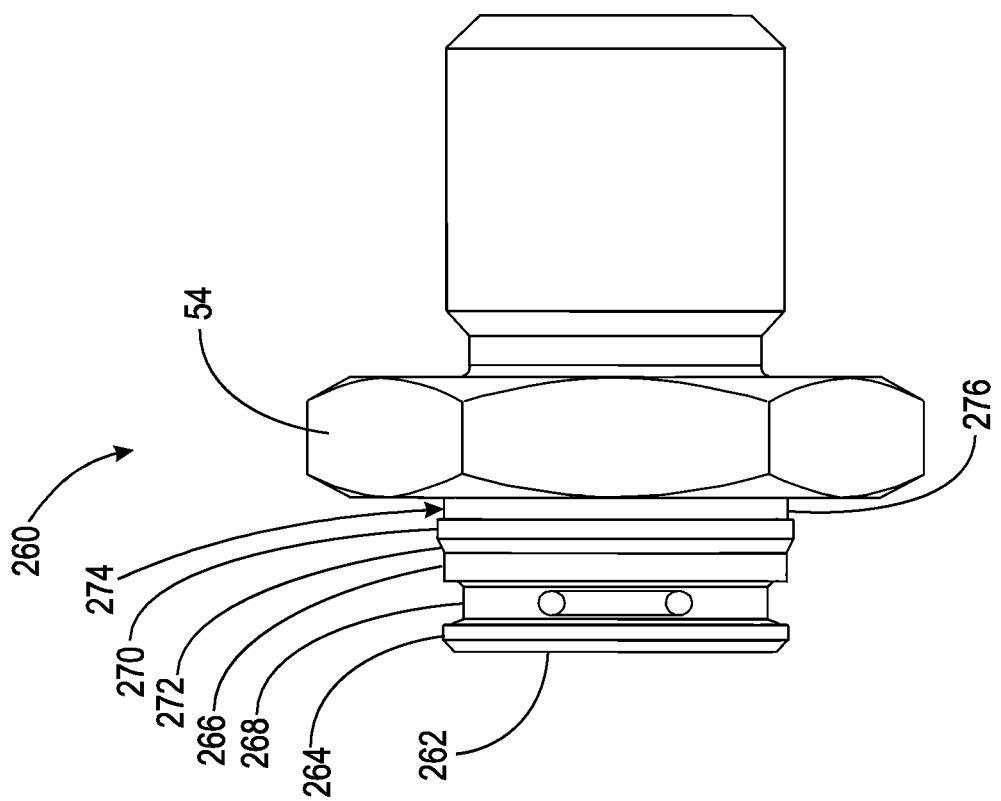

In another variation of fitting body 260 shown in FIGS. 13A and 13B, again fitting body 260 is substantially the same as fitting body 26 and only variations therebetween will be described in detail.

Like fitting body 230 shown in FIGS. 12A and 12B, fitting body 260 has first end 262 from which extends first end portion 264 of the receiving portion at a first diameter. The receiving portion includes second end portion 266, also at the same diameter to define recess 268 for resilient clip 60.

Fitting body 260 also includes raised annular ring 270 having an outer diameter greater than the first diameters of first and second end portions 264 and 266. Radially outward, conical shaped tapered surface 272 extends from second end portion 266 to raised annular ring 270. Recess or groove 274 is formed between raised annular ring 270 and hexed shaped portion of fitting body 260. Inner surface 276 of groove 274 is spaced at the same first diameter of first and second end portions 264 and 266 of the receiving portion of fitting body 260.

In this aspect, annular shoulder 270 forms a raised outermost portion of the receiving portion of fitting body 260. The difference between the outer diameter of annular ring 270 and inner surface 276 of adjacent groove 274 requires that the fingers on the assurance cap cab be flexed outward over the raised outer edge of annular ring 270 before snapping over the outer edge of annular ring 270 into groove 274.

Figure 14A:
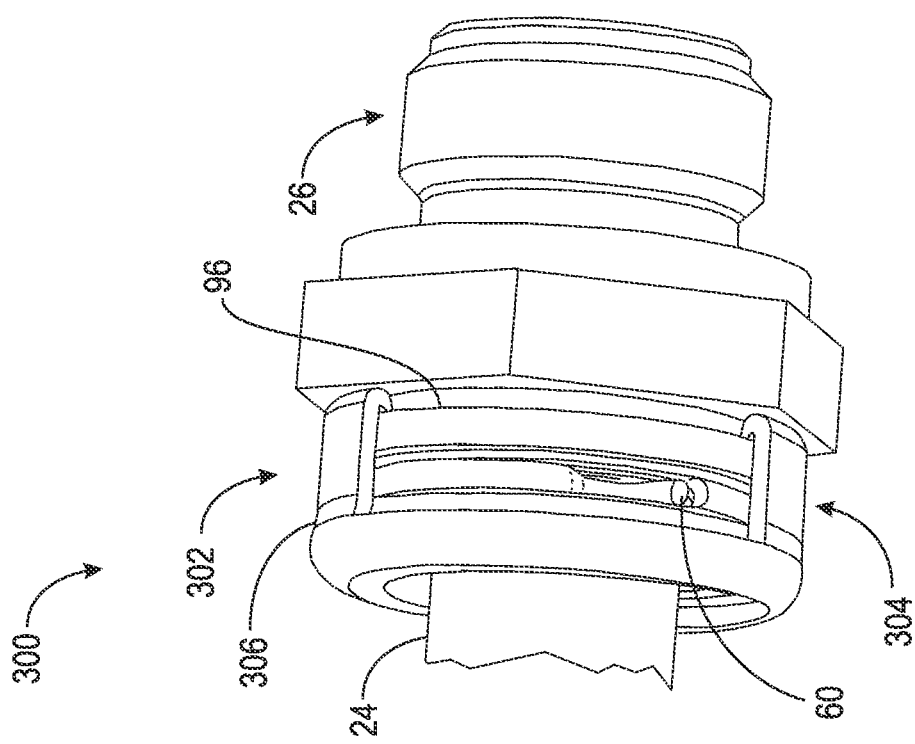
Figure 14A:
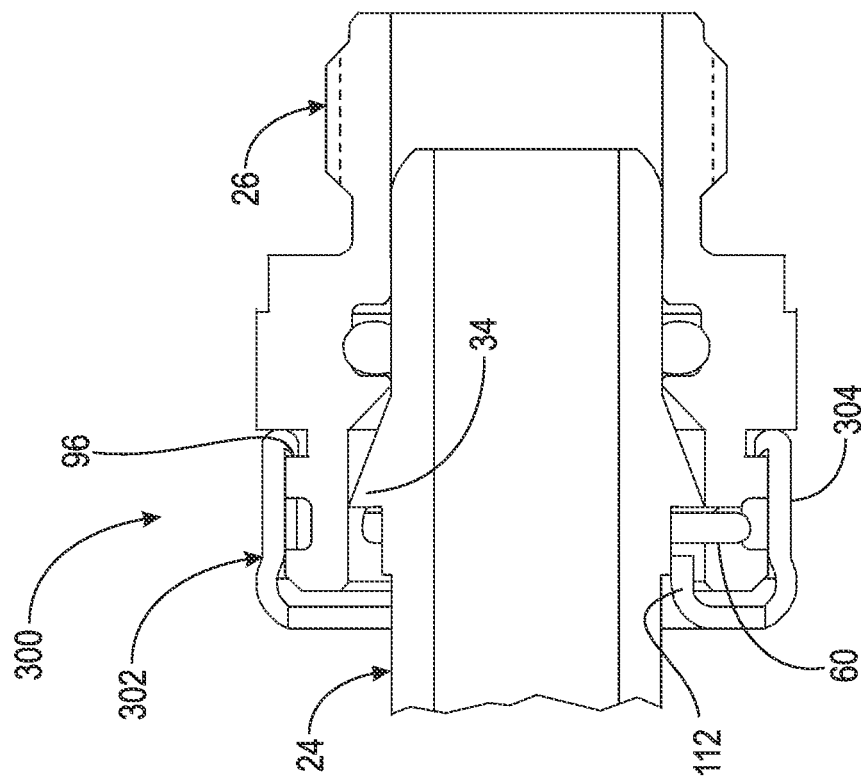

Referring now to FIGS. 14A and 14B, there is depicted another variation in the construction of assurance cap 300. In this aspect, assurance cap 300 is similar to assurance cap 70 described above and shown in FIGS. 1-8D except that assurance cap 300 has two small fingers 302 and 304 extending from intermediate annular portion 306. Fingers 302 and 304, which can be provided in any number, such as two, three, or more fingers, are configured more as stand-alone latch fingers rather than closely separate fingers 82, 84, and 86 on assurance cap 70, which have a much longer circumferential extent.

Latch fingers 302 and 304 are constructed similarly to latch fingers 82, 84, and 86 in assurance cap 70 and are designed to snap into and latch in groove 98 on body 26 when tubular member 24 is fully inserted into body 26.

Fingers 302 and 304 are spaced apart about the circumference of assurance cap 300 in an angular orientation designed to intercept the raised portions of the resilient clip which would extend outward beyond the upper extent of insertion portion 56 of body 26 from groove 98 when tubular member 24 is not fully inserted in body 26. Thus, for example, in a two finger construction shown in FIGS. 14A and 14B, two fingers 302 and 304 are spaced less than 180° apart to one side of assurance cap 300 and greater than 180° apart on the other side of assurance cap 300.

As shown in FIG. 14B, fingers 302 and 304 are circumferentially spaced so that at least one of fingers 302 or 304 is in a interference position with resilient clip 60 so as to strike a raised portion of resilient clip 60 extending out of groove 68 in body 26 to prevent full movement of assurance cap 300 to the fully forward latched position. This assures that assurance cap 300 functions in its intended manner regardless of its angular orientation with respect to the protrusions and outer portions of resilient 60 in groove 96.

When fluid connectors are secured to devices such as radiators, tubular connectors inserted into these fluid connectors may not be fully seated and allow leak paths to form once the assembly is pressurized. Current tubular connectors include a witness bead which is used as a visual indicator of proper sealing, but is not always reliable as it is dependent on a human user to check. Even if the witness bead appears properly inserted, small leak paths could form due to misalignment of the tubular connector within the fluid connector undetectable to the naked eye.

Figure 15A:
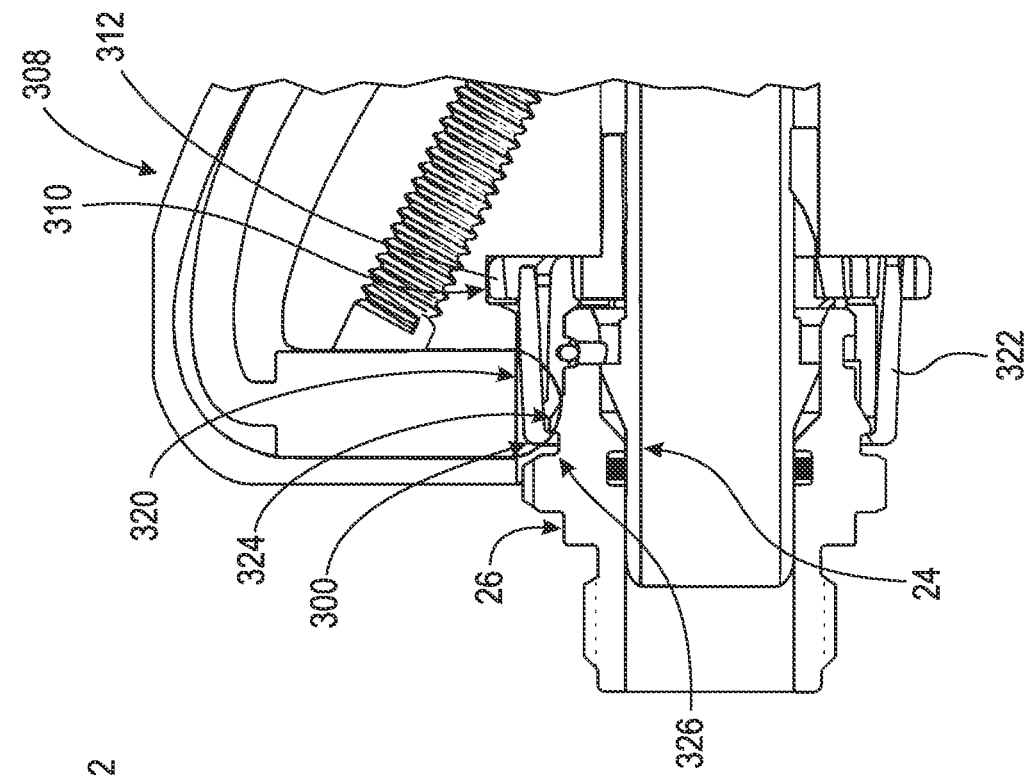
Figure 15B:
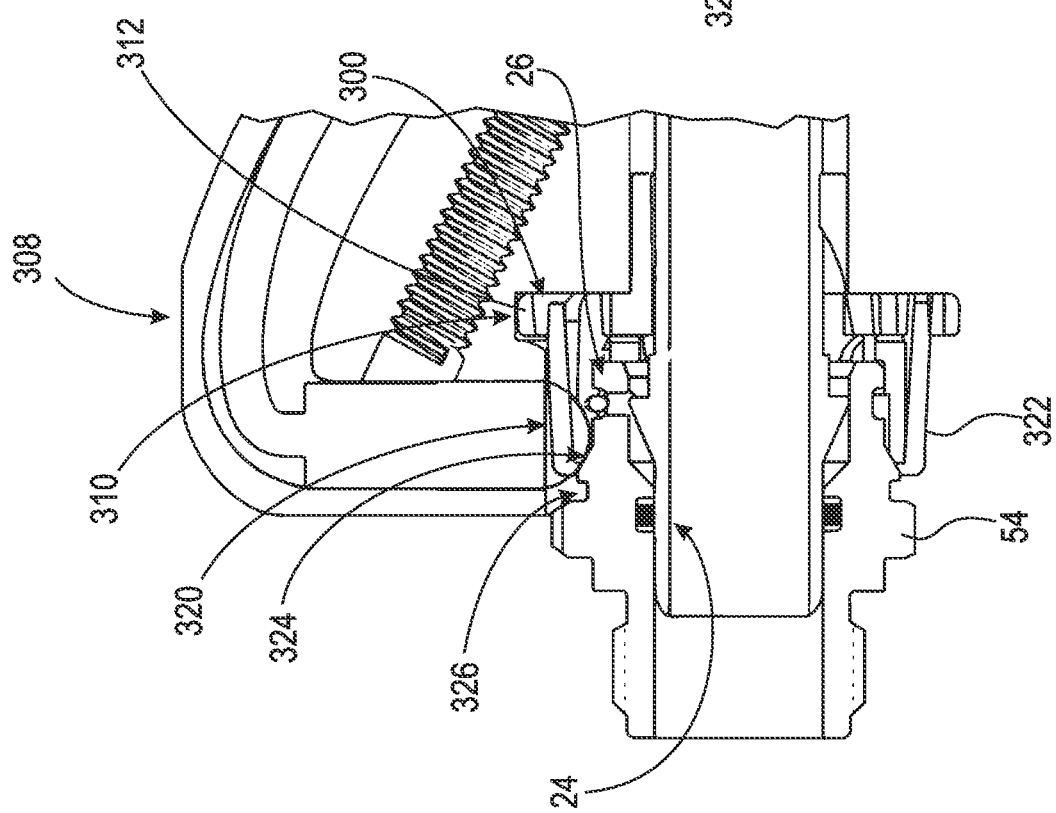

In order to solve this problem, as best seen in FIGS. 15A-B, the invention is both a tool 308 used to install an assurance cap 300 onto a connector body 26, as well as a detection means to ensure the assurance cap 300 is fully seated on the connector body 26. The tool 308 includes an annular groove 310 which a end 301 of the assurance cap 300 sits within. This annular groove 310 allows the assurance cap 300 to be axially installed onto the fluid connector 26. Additionally, within the annular grove 310 of the tool 308 is an optical sensor 312 which detects if the assurance cap 300 is properly positioned within the groove 310.

Also contained within the tool 308 is an inductive proximity sensor 320. In applications where the connector body 26 or an outer portion of the connector body 26 is manufactured of a metallic material, an inductive proximity sensor 320 can be used to detect the position of the connector body 26 relative to the tool 308. Once the assurance cap 300 is arranged in the annular groove 310 of the tool 308, the assurance cap 300 is slid axially, and arranged about a tubular member 24, over the connector body 26. As the assurance cap 300 reaches a certain axial position on the connector body 26, the flexible arms 322 of the assurance cap 300 will deform and pass over a raised shoulder 324, then deform back to their original position within a groove 326 on the connector body 26.

Due to geometry of the connector body 26 and the arrangement of the inductive proximity sensor 320 within the tool 308, the inductive proximity sensor 320 will detect the metallic body of the raised shoulder 324 and transmit a signal to the operator or manufacturing system indicating that the assurance cap 300 is properly installed on the connector body 26. Additionally, the optical sensor 312 simultaneously informs the user that the assurance cap 300 is still properly arranged within the annular groove 310 of the tool 308.

If the assurance cap 300 is not fully seated on the connector body 26, the inductive proximity sensor 320 will not be close enough to detect the raised shoulder 324 of the connector body 26. This will transmit an error signal to the operator or manufacturing system that the assurance cap 300 is not properly installed on the connector body 26 and is either a faulty part or needs to be axially positioned further onto the connector body 26.

The invention combines both a tool which can be used to install the assurance cap, as well as a detection means to measure the position of the assurance cap. This combination eliminates the need for an installer to use both a separate tool and then a separate sensor to ensure the assurance cap is properly installed.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

20 Fluid connector
22 End of member 24
24 Tubular member
26 Connector body
28 Threads
30 Head portion
32 First diameter portion
34 Tapered portion
36 Shoulder
37 End of tapered portion 34
40 Through bore
42, 44 Ends of body 26
46 Internal groove
48 Seal member
50 Groove
52 Annular collar
54 Projecting portion
56 Receiving portion
58 Annular groove
60 Clip
62 Assurance cap
64 Recess
70 Assurance cap
72 Annular body
74, 76 Ends of body 72
78 Sidewall
80 Slots
82, 84, 86 Latch fingers
90 End portion
92 Edge
94, 96 Shoulders
98 Annular groove
100 Endwall
102 Aperture
104, 106 End portions
110, 112 Latch fingers
114 Curled wall
115 Raised head
116 Edge wall
122 Axis
130 Assurance cap
132 Fingers
140 Hinge
142, 144 End portions
146 Latch finger
148 Latch recess
152, 154 Skirt portions
56, 158 Inner edges
170 Assurance cap
172 Body
174 Finger
176 Slot
178 Edge
180 Shoulder
182 Rib
184 End of body 172
186 Outer ring
188 Skirt
190 Inner edge
192 Radial slot
194 Fingers
200 Assurance cap
201 Body
202 Fingers
206 Slots
208 Shoulder
210 Rib
212 End of body 201
214 Ring
216 Skirt
218 Inner edge
230 Fitting body
232 End of body 230
234, 236 End portions
238 Groove
240 Ring
242 Endwall
244 Groove
260 Fitting body
262 End of body 260
264, 266 End portions
268 Recess
270 Ring
272 Tapered surface
274 Groove 276 Inner surface
300 Assurance cap
302, 304 Fingers
306 Intermediate portion
310 Annular groove
312 Optical sensor
320 Proximity sensor
322 Flexible arms
324 Shoulder
326 Annular groove

What is claimed is:

1. A tool for installing an assurance cap on a fluid connector assembly, the fluid connector assembly comprising a connector body including a resilient clip and a tubular member operatively arranged to be connected in the connector body, the tool comprising:
    a body including a radially inward facing surface;
    the radially inward facing surface comprising an annular groove arranged to engage an end of the assurance cap; and,
    a proximity sensor operatively arranged within the body to detect the position of the tool relative to the connector body.

2. The tool as recited in claim 1, wherein the proximity sensor is an inductive proximity sensor.

3. The tool as recited in claim 1, wherein the proximity sensor is operatively arranged to detect a position relative to a raised shoulder of the connector body.

4. The tool as recited in claim 3, wherein the proximity sensor is operatively arranged to send a signal indicating the position of the proximity sensor relative to the raised shoulder to a remote location.

5. The tool as recited in claim 1, further comprising an optical sensor arranged in the annular groove.

6. The tool as recited in claim 5, wherein the optical sensor is operatively arranged to detect if the assurance cap is properly positioned within the annular groove.

7. The tool as recited in claim 6, wherein the optical sensor is operatively arranged to send a signal indicating the position of the assurance cap within the annular groove to a remote location.

8. A method for installing an assurance cap on a fluid connector assembly, wherein the fluid connector assembly comprises a connector body including a resilient clip and a tubular member operatively arranged to be connected in the connector body, the method comprising:
    providing a tool including a body, the body comprising a radially inward facing surface including an annular groove arranged to engage an end of the assurance cap and a proximity sensor;
    displacing, using the tool, the assurance cap axially along the tubular member; and,
    detecting, using the proximity sensor, a position of the tool relative to the connector body.

9. The method as recited in claim 8, further comprising:
    sending, using the proximity sensor, a signal indicating the position of the tool relative to the connector body to a remote location.

10. The method as recited in claim 8, further comprising:
    providing an optical sensor in the annular groove of the tool; and,
    detecting, using the optical sensor, if the assurance cap is properly engaged with the annular groove.

11. The method as recited in claim 10, further comprising:
    sending, using the optical sensor, a signal indicating the position of the assurance cap within the annular groove to a remote location.

* * * * *